United States Patent [19]

Rudisill et al.

[11] Patent Number: 5,339,179
[45] Date of Patent: Aug. 16, 1994

[54] EDGE-LIT TRANSFLECTIVE NON-EMISSIVE DISPLAY WITH ANGLED INTERFACE MEANS ON BOTH SIDES OF LIGHT CONDUCTING PANEL

[75] Inventors: Charles A. Rudisill; Daniel J. Whittle, both of Apex, N.C.

[73] Assignee: International Business Machines Corp., Armonk, N.Y.

[21] Appl. No.: 955,524

[22] Filed: Oct. 1, 1992

[51] Int. Cl.$^5$ .................. G02F 1/1335; F21V 7/04; G02B 6/00
[52] U.S. Cl. ........................... 359/49; 359/48; 362/31; 385/901
[58] Field of Search .............. 359/48, 49; 385/129, 385/146, 901; 362/31, 26, 297

[56] References Cited

U.S. PATENT DOCUMENTS

| | | | |
|---|---|---|---|
| 3,994,564 | 11/1976 | Somogyi | 359/49 |
| 4,017,155 | 4/1977 | Yagi et al. | 359/49 |
| 4,519,678 | 5/1985 | Komatsubara et al. | 359/70 |
| 4,616,295 | 10/1986 | Jewell et al. | 362/31 |
| 4,706,173 | 11/1987 | Hamada et al. | 359/49 |
| 4,737,896 | 4/1988 | Mochizuki et al. | 359/48 |
| 5,040,878 | 8/1991 | Eichenlaub | 359/49 |
| 5,050,946 | 9/1991 | Hathaway et al. | 359/48 |

FOREIGN PATENT DOCUMENTS

| | | | |
|---|---|---|---|
| 3313288 | 10/1984 | Fed. Rep. of Germany | 359/49 |
| 60-123823 | 7/1985 | Japan | 359/49 |
| 62-73206 | 4/1987 | Japan | 385/901 |
| 64-11203 | 1/1989 | Japan | 385/901 |

OTHER PUBLICATIONS

K. J. Hathaway et al, "New Backlighting Technologies for LCDs", SID 91 Digest (May 1991), pp. 751–754.

*Primary Examiner*—Anita P. Gross
*Attorney, Agent, or Firm*—John J. Timar; Edward H. Duffield

[57] ABSTRACT

A transflective liquid crystal display (LCD) uses the reflective and refractive characteristics of an edge-lit flat light pipe as a backlight panel behind the liquid crystal layer. The front and/or back surfaces of the edge-lit backlight panel are textured to enhance reflectivity of ambient light and transmission of edge light. The front surface of the panel is textured with pits that have walls at an angle to enhance reflectivity over a range of viewing angles. Further, the back surface of the panel is textured with pits having wall angles, and a pattern to enhance the uniform reflection of edge light toward and through the front surface of the backlight panel. The indentations may be conical, triangular or random. The pit wall angles lie within a preferred range of angles to optimize the amount of light within the useable viewing angle for the LCD. Alternative embodiments include backlight panel where only the front surface has indentations and the back surface is flat and mirrored, or where only the back surface of the panel has indentations and the front surface is flat.

15 Claims, 4 Drawing Sheets

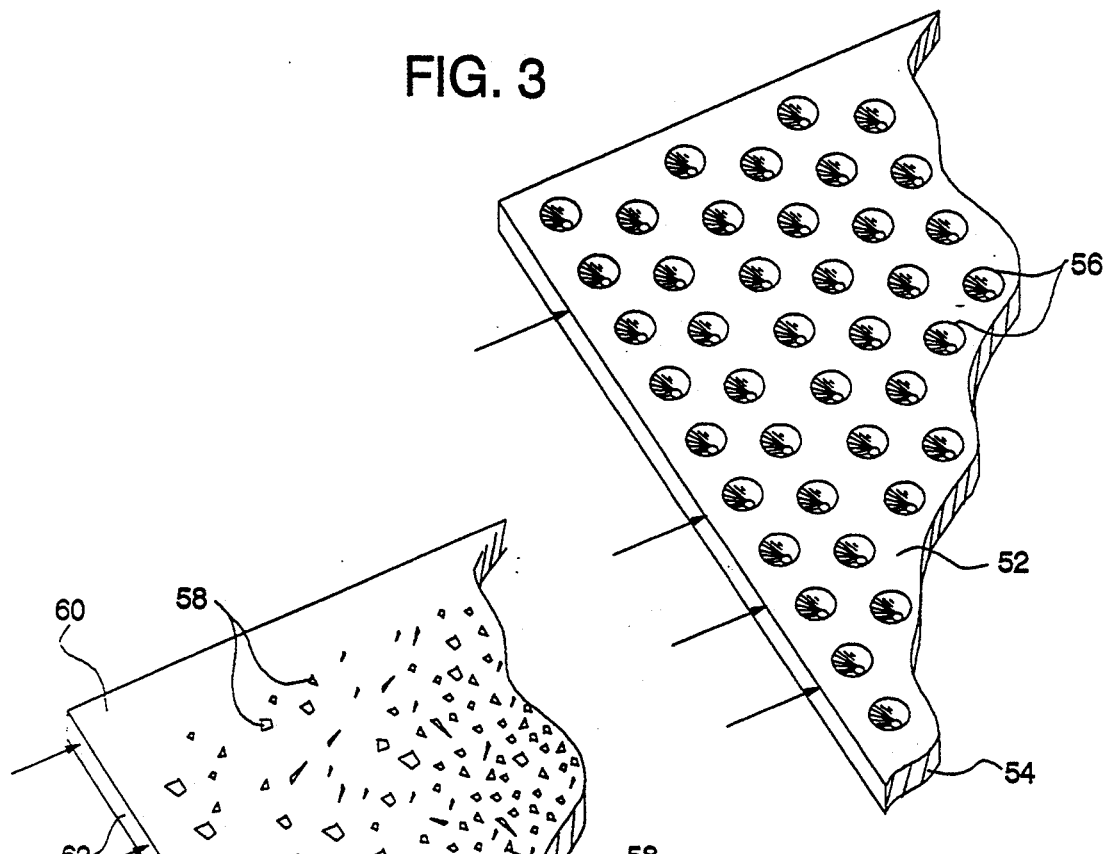
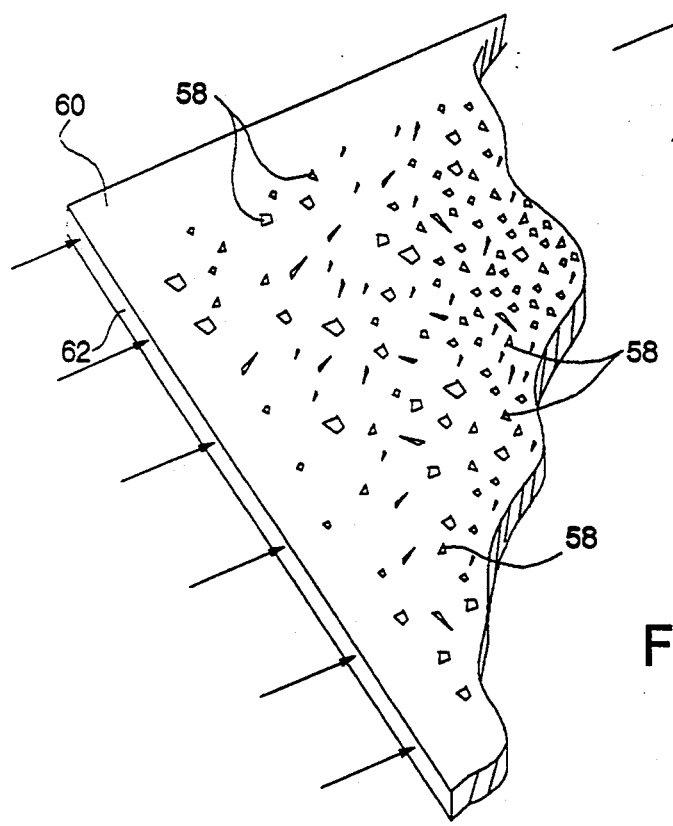

EDGE-LIT TRANSFLECTIVE NON-EMISSIVE DISPLAY WITH ANGLED INTERFACE MEANS ON BOTH SIDES OF LIGHT CONDUCTING PANEL

BACKGROUND OF THE INVENTION

1. Field of the Invention

This invention relates to an edge-lit transflective non-emissive display. More particularly, the invention relates to non-emissive displays, such as electrochromic, ferroelectric, ferromagnetic, electromagnetic, and liquid crystal displays, where the external light source for the display is ambient light and/or artificial light generated at the edge of a flat light conducting pipe behind a non-emissive layer.

2. Description of Prior Art

A liquid crystal layer between transparent plates is probably the most common non-emissive light device; such a liquid crystal device is non-emissive in that the liquid crystal layer generates no light. Non-emissive displays may modulate light by absorption, scattering, refraction, or polarization changes. In a liquid crystal display, the liquid crystal acts as a shutter, or selective light conductive device. The display depends upon light being passed, or not passed, through the liquid crystal layer to generate the display. In other words, the liquid crystal layer must have an external source of light for the liquid crystal display to produce an image.

In a reflective liquid crystal display (LCD), the source of light for the display is ambient light which enters through the front of the display, passes through the liquid crystal layer (LCL), and reflects back through the LCL from a reflective, or mirror, surface behind the LCL. U.S. Pat. No. 4,519,678 issued to Y. Komatsubara et al is an example of a reflective LCD.

In a transmissive LCD, artificial light is generated behind the LCL, or at the edge of a flat light pipe which distributes the light uniformly behind the LCL. Examples of transmissive LCD's are taught in the article entitled "New Backlighting Technologies for LCD's" by K. J. Hathaway, J. A. Hawthorne and A. A. Fleischer in the SID (*Society for Information Display*) 91 *Digest*, pp. 751–754. This article discusses backlighting with flat fluorescent lamps. Such lighting is not attractive for LCD's because of problems with uniformity of light from the tubes, and because the tubes are relatively bulky and require too much electrical power for the typical LCD environment. Hathaway et al suggest that an edge-lit wedge-shaped light pipe behind the liquid crystal is the better approach to backlighting the LCD. The rear surface of the light pipe has a diffuser, or prismatic specular reflector, to shape the light distribution as a function of viewing angle.

Another example of edge-lit light piping for backlighting an LCD is taught in U.S. Pat. No. 4,616,295 issued to M. B. Jewell et al and entitled "Apparatus for Mounting and Illuminating Liquid Crystal Displays." A feature in the Jewell et al patent is varying the light diffusion pattern with the distance from the edge light to provide more uniform backlight for the liquid crystal. Many edge-lit light pipes for LCD's commercially available today use a pattern of diffusing dots that increase in frequency and/or size with distance from the edge light in order to produce more uniform backlighting of the LCD.

Transflective LCD's use an edge-lit light pipe behind the LCL and, in addition, the front surface of the light pipe is partially reflective so that ambient light is partially reflected back through the LCL. Transflective LCD's are shown in U.S. Pat. No. 3,994,564 issued to B. Somogyi, and U.S. Pat. No. 4,017,155 issued to K. Yagi et al. Transflective liquid crystal displays have the problem of optimizing the transflective optical element for both ambient light and edge light. Typically, the transflective element uses an edge-lit flat light pipe, and coats the front surface of light pipe with a 70/30 reflective material. In this design, 70% of the ambient light reaching the reflective material is reflected back through the liquid crystal layer. Conversely, only 30% of the light from the edge-lit light pipe is passed by the 70/30 coating through the liquid crystal layer. Accordingly, while transflective LCD's are operative with, or without, ambient light, they are not very efficient in power consumption when the edge light is being used.

SUMMARY OF THE INVENTION

It is an object of this invention to produce a transflective LCD which is as efficient as a reflective LCD when relying on ambient light, and is as efficient as a transmissive LCD when relying on transmissive light.

In accordance with this invention, the above object is accomplished by using the reflective and refractive characteristics of an edge-lit flat light pipe as a backlight panel behind the liquid crystal layer. The front and/or back surfaces of the edge-lit backlight panel are textured to enhance reflectivity of ambient light and transmission of artificial light from the edge light source. The front surface of the panel is textured with pits that have walls at an angle to enhance reflectivity over a range of viewing angles. Further, the back surface of the panel is textured with pits having wall angles and a pattern to enhance the uniform reflection of edge light toward, and through, the front surface of the backlight panel. In other words, the front surface has indentations to enhance reflectivity from the front, but not impede transmission from the rear while the rear surface has indentations to enhance reflectivity of edge light out the front surface of the backlight panel.

The great advantage of this invention is that the pitted flat light pipe, or backlight panel, achieves LCD brightness from ambient light which is as great as if a total reflective coating were placed behind the light crystal layer and also achieves LCD brightness from edge-light which is as great or greater than conventional transmissive LCD's. There is no diffuse material added to the backlight panel, such as paint or vellum. Such materials significantly increase light loss in the light pipe, or scatter light at wide angles outside of the useable viewing angles for the display.

Other objects, advantages and features of the invention will be understood by those of ordinary skill in the art after referring to the complete written description of the preferred embodiments in conjunction with the following drawings.

BRIEF DESCRIPTION OF THE DRAWINGS

FIG. 3 shows a backlight panel with a front surface textured with conical pits and a flat, mirrored back surface.

FIG. 4 shows a backlight panel with a front surface textured with random pits and a flat, mirrored back surface.

FIG. 6 is a detail of a backlight panel having front surface pits with walls at selected angles and a flat, mirrored back surface.

DESCRIPTION OF THE PREFERRED EMBODIMENTS

Figure 1:
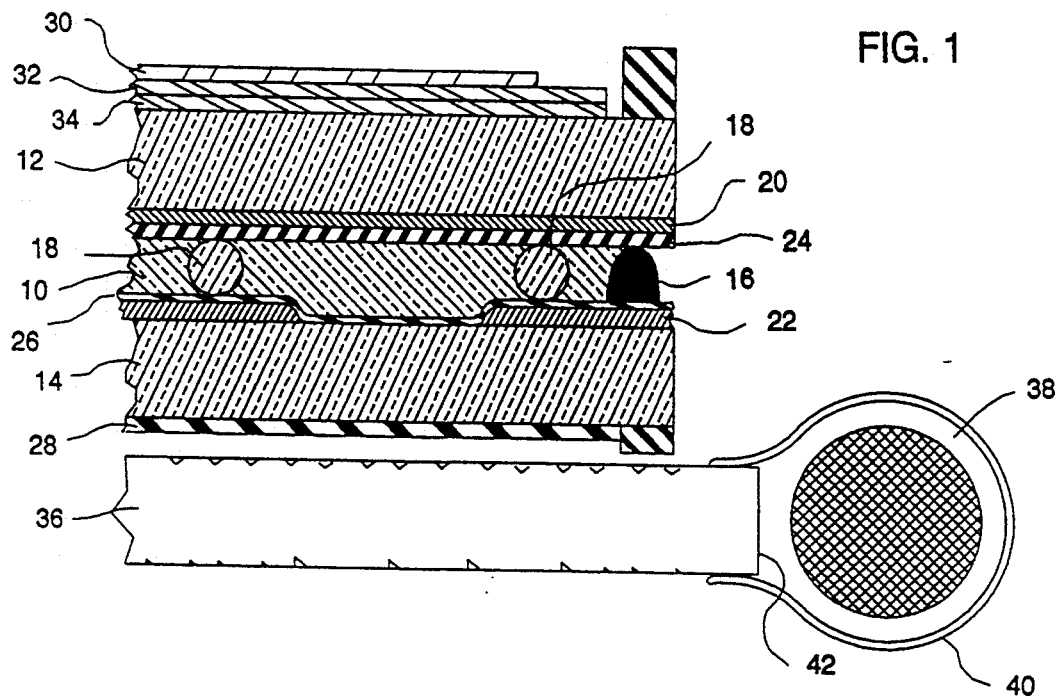
FIG. 1 shows the preferred embodiment of the edge-lit transflective display.

FIG. 1 is a cross-section of the preferred embodiment of the invention in a liquid crystal display (LCD). The liquid crystal layer (LCL) 10 is contained between two glass plates 12 and 14 by adhesive seal 16 at the edge of the plates. The plates are held apart by glass, or plastic, spacer balls or beads 18.

The inside surface of the glass plates has deposited therein patterns of transparent electrical conductors of indium tin oxide (ITO). The conductive pattern 20 on the front plate is horizontal strips. The conductive pattern 22 on the back plate are vertical strips. As will be explained shortly, applying a voltage between a horizontal strip and a vertical strip will change the liquid crystal display at the intersection of the two strips from light to dark.

Polyimide layers 24 and 26 are coated on the inner surface of the glass plates. The layers serve two functions. First, they are a good insulator between the strips of ITO conductors 20 and 22. Second, they have a surface textured, or rubbed, in a given direction to encourage crystal orientation at a particular angle by liquid crystals adjacent to the polyimide layers.

The outside surface of the back glass plate 14 has a linear polarizer 28 attached thereto. Similarly, linear polarizer 30, oriented with its plane of polarization 90° to polarizer 28, is bonded on the outside of the top glass plate 12. In addition, the top plate 12 has color compensation layers 32 and 34 bonded thereon. These color compensation layers counteract the color shift, or dispersion, of the light that occurs as the light passes through the LCL. As a result of the color compensation layers 32 and 34, a black/white display is produced.

Behind polarizer 28, on the back plate 14, is the backlight panel or flat lightpipe 36. The backlight panel operates (1) to reflect ambient light entering the LCD from the front, and (2) to provide additional light from an artificial light source at the edge of the backlight panel 36 behind the liquid crystal layer. The edge light is a fluorescent tube 38, contained within a tubular housing 40, that has an inner mirrored surface. Light generated from tube 38 enters the backlight panel 36 through edge 42 of the panel, and is reflected up through the liquid crystal layer.

The liquid crystal layer (LCL) 10 is a twisted nematic liquid crystal layer (TN-LCL). The crystals tend to align themselves with the orientation of the rubbed texture of the surface of polyimide layers 24 and 26. The surfaces of polyimide layers 24 and 26 are oriented in alignment with polarizers 30 and 28, respectively. Since the crystals adjacent the polyimide layers tend to align with the surface texture of the layers, the chain of crystals in the TN-LCL twists from front to back layers (approximately 270° in the preferred embodiment). Linear polarized light is rotated (270°) by the crystals as it passes through the LCL from front to back. Since the polymide layers are aligned with the polarizers, the light will pass through both polarizers 28 and 30. Therefore, the LCD appears light or bright when the LCL is in a relaxed state.

When a voltage is applied between two conductive strips 20 and 22, the crystal chain in the TN-LCL will untwist at the intersection between the two strips. Polarizers 30 and 28 are oriented at an angle approximately 90° to each other. Therefore, light passing through the untwisted portion of the LCL is not rotated, and is sharply attenuated by the crossed polarizers. The portion of the LCD at the intersection of the energized strips 20 and 22 appears dark. To summarize, when the TN-LCL is in a relaxed state, light passes through the combination of two polarizers and the LCL; when the TN-LCL is energized at a given spot or picture element, light does not pass through the combination of two polarizers and the LCL.

As just described, the preferred embodiment by selectively passing light through the polarizers and the LCL produces a dark on light display. It will be apparent to one skilled in the art that the polarizers can just as well be oriented relative to the LCL to produce a light on dark display.

Further, the light may be ambient light that enters from the front and is reflected by backlight panel 36, or the light may be light from the backlight panel 36 that is supplied by edge light 38.

Figure 2A:
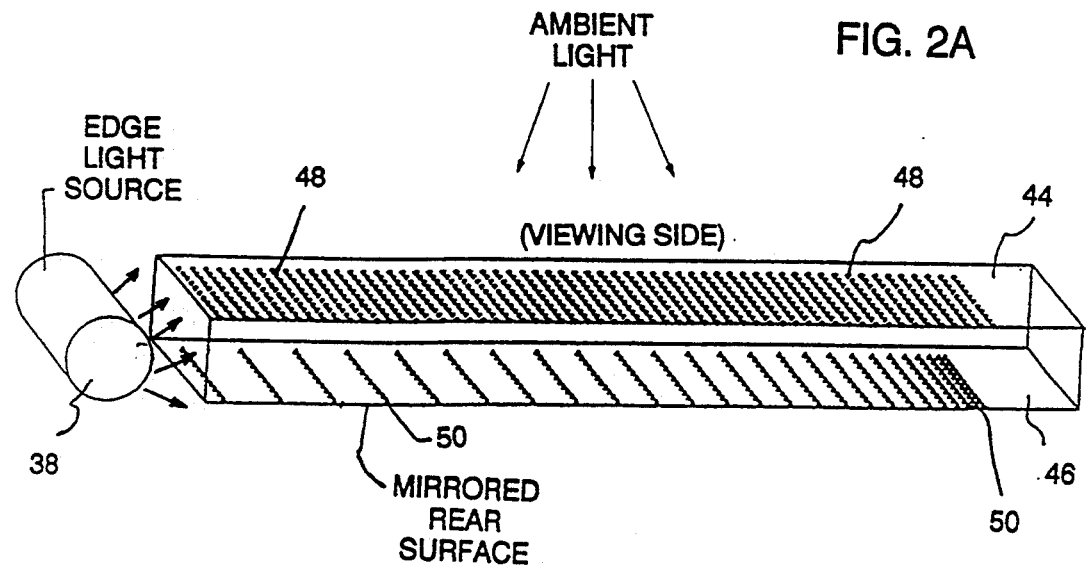
FIG. 2A illustrates the backlight panel in FIGURE 1.

In FIG. 2A, the backlight panel is shown in more detail. The top surface 44 of the panel has indentations, or pits, to enhance the reflection of ambient light from the front of the LCD. The bottom surface 46 is also pitted to enhance the reflection of edge light from fluorescent tube 38 up through the LCL. Pits 48, on top surface 44, are uniformly distributed, and consume 40% to 70% of the surface area in the preferred embodiment. The areal density of pits 50 on the bottom surface 46 increases as a function of distance from the edge light 38. Since the intensity of the edge light decreases as a function of distance, increasing the number of pits per unit of surface area as a function of distance will distribute light from the edge light 38 uniformly throughout the LCD.

The reflection of ambient light is enhanced by conical pits, or indentations, 48 in the top surface 44 due to the angles of the walls in the pits. The optimum angle for the walls depends on the position of the ambient light source and the position of the viewer. Typically, the viewing angle by a viewer is normal to the front surface of the LCD and, thus, the top surface of backlight panel 36. However, the position of the ambient light source may vary greatly. The optimum angle for ambient light is normal to the front surface. Worst-case angle for ambient light is from the side as, for example, light through a window located at the side of the viewer.

Figure 2B:
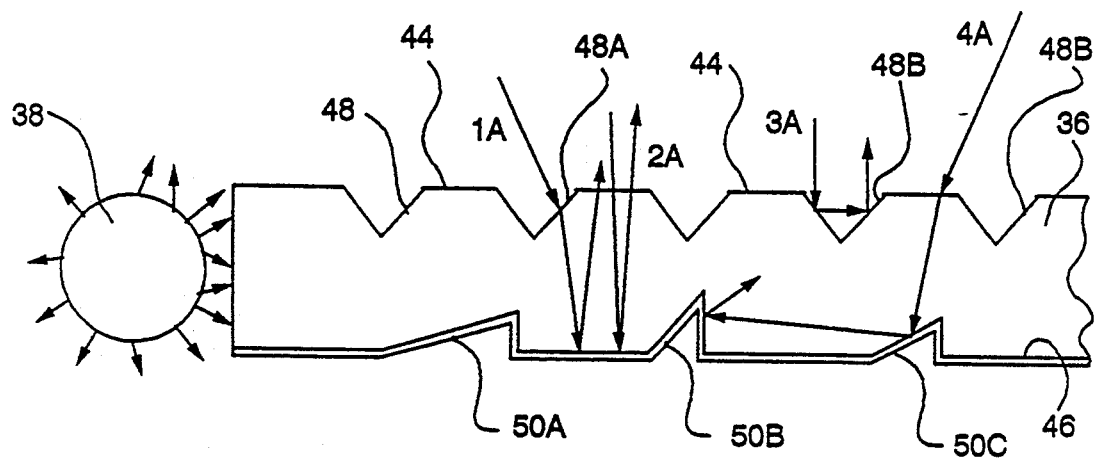
FIG. 2B is a detail of the FIG. 2A backlight panel indicating the path of typical light rays in the panel due to ambient light.
Figure 2C:
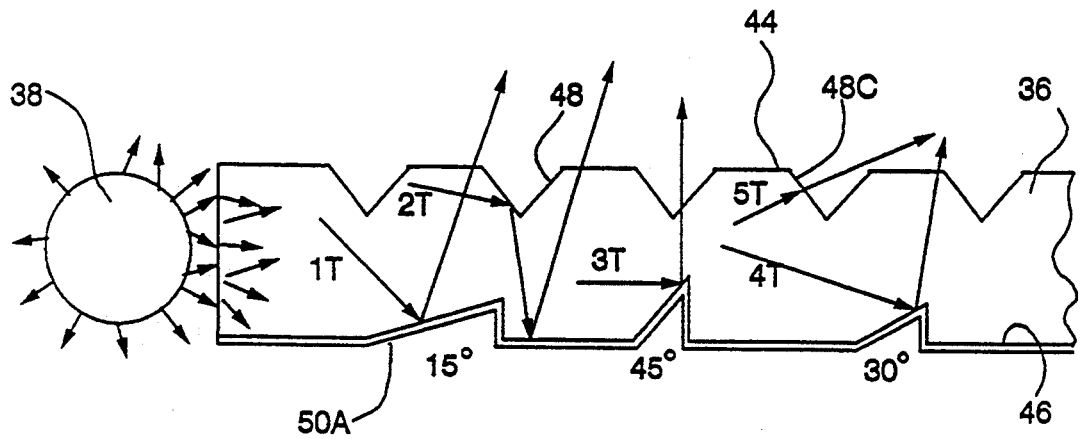
FIG. 2C is a detail of the FIG. 2A backlight panel indicating typical light paths when the panel is edge lit.

In FIGS. 2B and 2C, there is a detail illustration of a small portion of the backlight panel 36 that shows the preferred angles of the indentations 48 and 50, and the paths of a sample of light rays. In FIG. 2B, the light rays are from an ambient light source, while in FIG. 2C, the light rays are from the edge light 38. The conical pits 48 in top surface 44 have walls that make a 45° angle with a line normal to surface 44. Ambient light ray 1A comes from the side, strikes the wall of pit 48A, and is refracted into the panel 36. Light ray 2A is near normal to the top surface, and almost all of its light is refracted into panel 36. A small portion of light (typically 4–10%) striking the top surface will also be reflected back through the LCL (the top surface reflected ray is not shown). Both of the refracted rays 1A and 2A are reflected from the mirrored bottom surface 46 of the panel 36, and are within a useful viewing angle. In effect, the wall of pit 48A has collected some ambient side light and directed it within a usable viewing angle.

Light ray 3A is near normal, but strikes the wall of pit 48B. Since the angle of ray 3A is beyond the angle of refraction, ray 3A is reflected to another wall of pit 48B and back up through the LCL. Accordingly, light striking the pits 48 that is beyond the angle of refraction will be directly reflected back to the viewer within the useable viewing angle. In effect, less light is refracted into the backlight panel where it may be lost. Light ray 4A strikes the top surface 44 near normal, and most of its light is refracted into the panel 36. The refracted light ray 4A strikes the mirrored wall of a bottom surface pit. This light ray may be ultimately reflected back out the top surface 44, or it may be lost, or dissipated, within the panel 36.

In FIG. 2C, the indentations, or pits, 50 have the cross-sectional shape of a right triangle. The hypotenuse of the triangle is the wall of the pit facing the edge light 38. Transmitted light ray 1T, from the edge light 38, is reflected off the mirrored facing wall of indentation 50A, and exits out the top surface of the panel 36 within the useable viewing angle. Light ray 2T, which has been internally reflected in panel 36 prior to the path shown in FIG. 2C, is reflected off inner wall of pit 48C, the mirrored bottom surface 46, and out the top surface 44 at a useable viewing angle.

Light rays 3T and 4T are reflected off mirrored walls of indentations 50B and 50C, and out the top surface 44 of panel within a useable viewing angle. Indentations 50A, 50B and 50C each have different wall angles which are 15°, 45° and 30°, respectively, relative to the bottom surface 46. As a result, the range of incident angles of rays internal to panel 36 that are successfully reflected out the top surface 44 at a useable viewing angle is increased.

Light ray 5T is a ray that strikes the inner wall of pit 48C within the angle of refraction. This ray is refracted through the top surface, and is lost as it is outside a useable viewing angle.

By texturing, or pitting, the front and back surfaces of the backlight panel, as discussed above, the illumination available to the LCD is significantly increased over conventional transflective display structures that use partially reflecting mirrors for both reflected ambient light and transmitted edge light. Several factors contribute to this improvement. First, the mirrored surface is located at the back surface rather than the top surface of the flat lightpipe or panel. Accordingly, no tradeoff is necessary between reflection and transmission for the mirror, and the mirror can have the highest reflectivity practical because edge light does not have to pass through the mirror. Second, the pits in the front surface of the lightpipe are designed to reflect light within the viewing cone (useable viewing angle), rather than randomly diffusing ambient light as conventional top surface diffusers have done in prior transflective backlights. Third, the pits in the front and back surface can be shaped to direct both ambient and edge light to the useable viewing angle. In addition, the small size and close spacing possible with these pits eliminates the need to hide them with a diffusing material.

Alternative embodiments for textured backlight panels are shown in FIGS. 3–6. In FIG. 3, the top surface 52 is pitted as in FIGS. 2B and 2C, but the bottom surface is simply a flat, mirrored surface. The conical pits 56 are evenly distributed. In operation, edge light traveling through the panel from the edge would be reflected downward by the pit walls to the mirrored bottom surface which is flat. The light would then be reflected back up from the bottom surface and through the LCL.

A further variation to the embodiment in FIG. 3 would be to vary the areal density of pits on the top surface as a function of distance from the edge light. This variation in areal density would provide for more uniform illumination of the liquid crystal layer by the edge light.

In FIG. 4, the pits 58, in the top surface 60 of the backlight panel, are random in depth and wall angles, and are increasing in areal density as a function of distance from the edge light introduced at edge 62 of the panel. The bottom surface 64 of the panel is a flat mirrored surface. The top surface may be randomly pitted by molding the surface with crystals used in making sandpaper. Garnet crystals, used in sandpaper, produce a distribution of pit wall angles which are in the proper range for reflecting light rays within the useable viewing angle. The garnet crystals tend to have three primary facets and, thus, may be used to produce pits similar to that produced by a tetrahedral-shaped indenter. The width of the pits ranges from 0.001" (0.025 mm) to 0.005" (0.127 mm), and the pits have side wall angles that randomly vary between 15° and 60° (preferably 25° to 45°) from a line perpendicular to the front surface of the backlight panel; i.e., normal to the LCD screen.

Figure 5A:
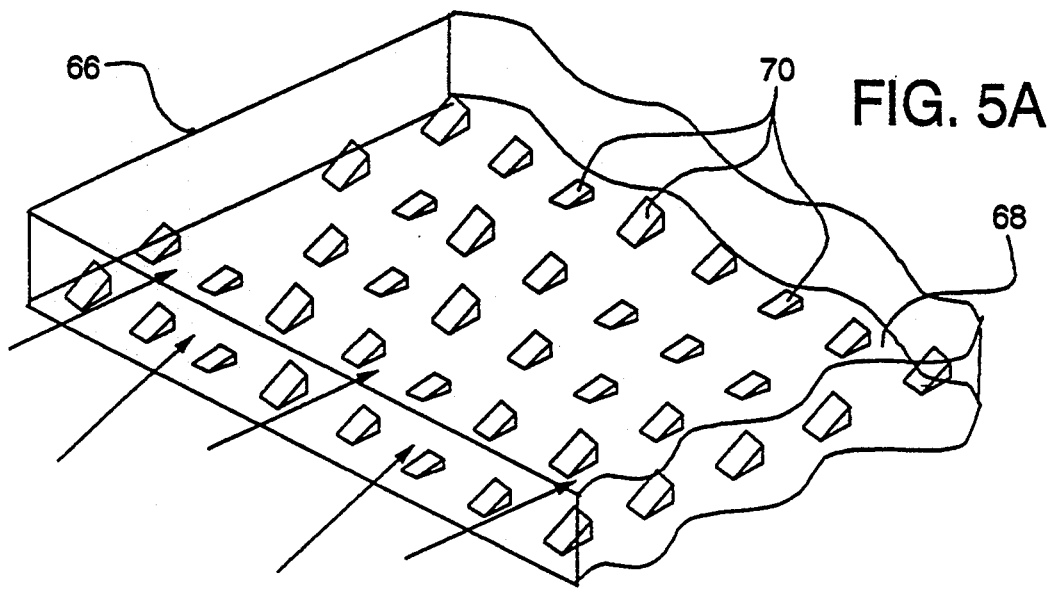
FIG. 5A shows a backlight panel with only the back surface mirrored and pitted; the walls of the pits have predefined angles relative to a line normal to the back surface.
Figure 5B:
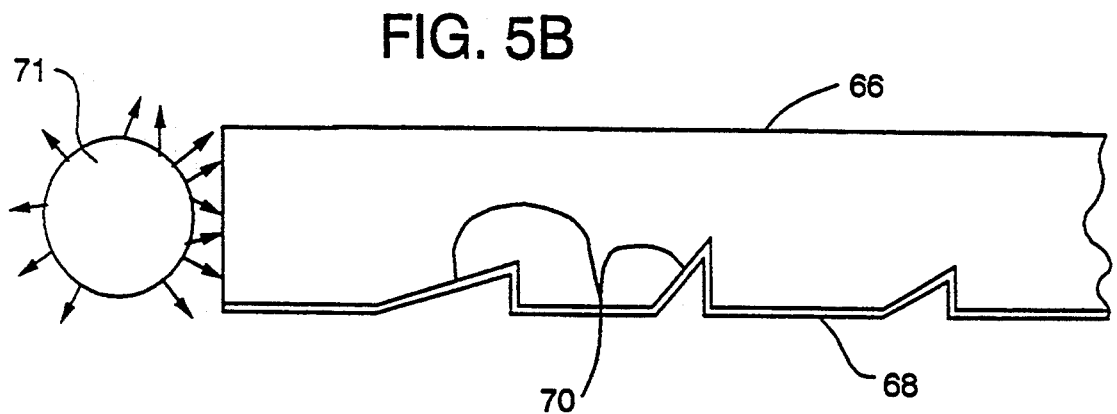
FIG. 5B is a detail of the backlight panel in FIG. 5A.
Figure 5C:
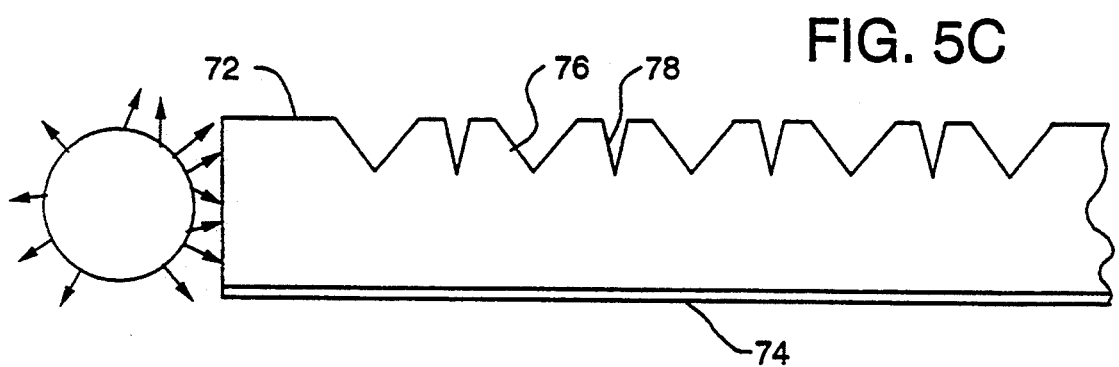

In FIGS. 5A and 5B, the backlight panel has a flat transparent top surface 66 and a pitted, mirrored bottom surface 68, as described in FIGS. 2B and 2C. Again, the areal density of pits 70 in the bottom surface 68 would increase as a function of the distance from the edge light 71. The pits 70 vary in angle as in FIGS. 2B and 2C.

In FIG. 6, only the top surface 72 of a backlight panel is pitted or textured. The bottom surface, or back, 74 of the panel is a flat, mirrored surface. Pits in the top surface 72 have preselected wall angles to increase the useable light gathering or viewing angle range provided by the panel. Pits, like pit 76, have wall angles of 45°, while pits like pit 78 have wall angles of 15° relative to a line normal to the top surface 72.

Each of the alternative embodiments in FIGS. 3–6 may be the least expensive to manufacture as they have only one textured surface. However, the embodiments most effective in providing light for the LCD are the embodiments described in FIGS. 1 and 2 where both the top and bottom surfaces of the backlight panel have indentations.

While a number of preferred embodiments of the invention have been shown and described, it will be appreciated by one skilled in the art, that a number of further variations, or modifications, may be made without departing from the spirit and scope of our invention.

What is claimed is:

1. A transflective non-emissive display apparatus for generating a display with ambient light from in front of the display and with artificial light from within the display, said apparatus comprising:

a non-emissive light means for selectively passing light whereby the display appears light or dark to a viewer in front of the display depending on whether light is passed, or not passed, by said light means;

artificial light means behind said non-emissive light means, said artificial light means for generating light for selective passage through the non-emissive light means;

a backlight means behind said non-emissive light means and responsive to ambient light and to said artificial light means, said backlight means for reflecting ambient light that has passed through said non-emissive light means from the front of the display towards the non-emissive light means, and said backlight means for reflecting and refracting light from said artificial light means towards the non-emissive light means, said backlight means having front and back walls; and interface means in at least one of said front and back walls, said interface means being positioned at an angle relative to incident ambient light and artificial light for reflecting and refracting ambient light and artificial light towards said non-emissive light means at a useable viewing angle for the viewer, wherein said interface means comprises a first light interface means in said front wall positioned at an angle for reflecting the ambient light at a useable viewing angle towards said non-emissive light means; and a second light interface means in the back wall positioned at an angle for reflecting artificial light out the front wall and toward said non-emissive light means.

2. The apparatus of claim 1 wherein:

said second light interface means is in portions of the back wall and the remaining portions of the back wall reflect ambient light refracted by said front wall back towards said non-emissive light means.

3. The apparatus of claim 1 wherein said non-emissive light means comprises:

liquid crystal means for rotating polarized light when in a first state and not rotating polarized light when in a second state;

a first polarizing means in front of said crystal means for linearly polarizing light; and a second polarizing means behind said crystal means for linearly polarizing light, said first and second polarizing means oriented relative to each other whereby light is passed by said non-emissive means when said crystal means is in the one of the first or second state and light is not passed by said non-emissive means when said crystal means is in the other state.

4. A transflective non-emissive display apparatus comprising:

a non-emissive light means for controlling the passage of light whereby portions of said display appear light or dark to a viewer in front of the display depending on whether light is passed or not passed by corresponding portions of said light means;

a light conducting panel behind said non-emissive light means, said light conducting panel having front, back and side walls, said front and back walls oriented for reflecting ambient light that has passed through said light means;

an edge light source for introducing light in one of the side walls of said light conducting panel;

at least one of said front and back walls having surface indentations in the wall;

a plurality of said indentations having indentation wall angles oriented relative to incident ambient light to refract and reflect the ambient light towards said non-emissive light means at a useable viewing angle for the viewer; and a plurality of said indentations having indentation wall angles oriented relative to incident edge light to refract and reflect the edge light towards said non-emissive light means at a useable viewing angle, wherein said indentations comprise:

indentations in said front wall having wall angles for reflecting the ambient light that passed through said non-emissive light means back through said non-emissive light means at a useable viewing angle and for reflecting edge light inside the light conducting panel towards the back wall; indentations in the back wall having wall angles for reflecting ambient light, refracted through the front wall, and edge light out the front wall and toward said non-emissive light means.

5. The apparatus of claim 4 wherein:

said front wall indentations are distributed uniformly through out the surface of the front wall; and said back wall indentations are distributed such that the areal density of the indentations in the back wall increases as a function of the distance from the side wall through which the edge light is introduced.

6. The apparatus of claim 5 wherein:

said front wall indentations are conical; and said back wall indentations are triangular in cross-sectional shape with one wall facing the edge-lit side wall.

7. The apparatus of claim 6 wherein:

pluralities of said back wall indentations have edge light facing walls oriented at one of a plurality of angles, said one angle being one of approximately 15°, 30°, or 45° relative to the back wall.

8. The apparatus of claim 4 wherein said front wall indentations are conical.

9. The apparatus of claim 4 wherein:

pluralities of said front wall indentations primarily have walls oriented at one or more of a plurality of angles relative to a line normal to the front wall surface, the plurality of wall angles being between 15° and 60°.

10. The apparatus of claim 4 wherein:

said front wall indentations are distributed such that the areal density of the indentations in the front wall increases as a function of the distance from the side wall through which the edge light is introduced.

11. The apparatus of claim 4 wherein:

pluralities of said back wall indentations have edge light facing walls oriented at one of a plurality of angles, said one angle being one of approximately 15°, 30° and 45° relative to the back wall.

12. The apparatus of claim 11 wherein:

said back wall indentations are distributed such that the areal density of the indentations in the back wall increases as a function of the distance from the side wall through which the edge light is introduced.

13. A transflective non-emissive display apparatus comprising:

liquid crystal layer for rotating polarized light when in a first state and not rotating polarized light when in a second state;

a first polarizer in front of said crystal layer for linearly polarizing light;

a second polarizer behind said crystal layer for linearly polarizing light, said first and second polarizers oriented relative to each other whereby light is passed by said polarizers when said crystal layer is in one of the first or second states and light is not passed by said polarizers when said crystal layer is in the other state;

a light conducting panel behind said liquid crystal layer, said light conducting panel having front, back and side walls, said front and back walls oriented for reflecting ambient light that has passed through said layer;

an edge light source for introducing light in one of the side walls of said light conducting panel;

said front and back walls having surface indentations in the wall;

indentations in said front wall having wall angles for reflecting the ambient light that passed through said liquid crystal layer back through said layer at a useable viewing angle and for reflecting edge light inside the light panel towards the back wall; and indentations in the back wall having wall angles for reflecting ambient light, refracted through the front wall, and edge light toward said liquid crystal layer.

14. The apparatus of claim 13 wherein:

said front wall indentations are distributed uniformly through out the surface of the front wall; and said back wall indentations are distributed such that the areal density of the indentations in the back wall increases as a function of the distance from the side wall through which the edge light is introduced.

15. The apparatus of claim 14 wherein:

pluralities of said front wall indentations primarily have walls oriented at one or more of a plurality of angles relative to a line normal to the front wall surface, the plurality of wall angles being between 15° and 60°.

* * * * *